US012449086B2

(12) United States Patent
Huang

(10) Patent No.: US 12,449,086 B2
(45) Date of Patent: Oct. 21, 2025

(54) SUPPORTING STRUCTURE

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 63 days.

(21) Appl. No.: 18/443,316

(22) Filed: Feb. 16, 2024

(65) Prior Publication Data

US 2025/0230895 A1 Jul. 17, 2025

(30) Foreign Application Priority Data

Jan. 16, 2024 (TW) ................................. 113200526

(51) Int. Cl.
*F16M 11/12* (2006.01)

(52) U.S. Cl.
CPC ........ *F16M 11/12* (2013.01); *F16M 2200/025* (2013.01); *F16M 2200/041* (2013.01); *F16M 2200/06* (2013.01)

(58) Field of Classification Search
CPC ...... F16M 11/02; F16M 11/046; F16M 11/10; F16M 2200/024; F16M 2200/021; F16M 2200/02; F16M 2200/06; F16M 2200/041; F16M 2200/025; F16M 11/12
USPC .................................................... 248/123.11
See application file for complete search history.

(56) References Cited

U.S. PATENT DOCUMENTS

| | | | |
|---|---|---|---|
| 7,775,485 B2 | 8/2010 | Asai et al. | |
| 9,266,243 B2 * | 2/2016 | Swartz | F16M 13/022 |
| 2008/0132786 A1 * | 6/2008 | Asai | A61B 8/462 248/221.11 |
| 2008/0234577 A1 * | 9/2008 | Murkowski | A61B 8/00 361/825 |
| 2012/0182709 A1 * | 7/2012 | Asai | A61B 8/4405 361/810 |
| 2014/0366674 A1 * | 12/2014 | Swartz | F16M 13/022 901/27 |
| 2019/0086022 A1 * | 3/2019 | Anderson | F16M 11/2014 |
| 2023/0064659 A1 * | 3/2023 | Mukai | F16M 11/2021 |
| 2023/0068344 A1 * | 3/2023 | Mukai | F16M 11/42 |

FOREIGN PATENT DOCUMENTS

CN 101202123 6/2010

* cited by examiner

*Primary Examiner* — Christopher Garft
(74) *Attorney, Agent, or Firm* — JCIPRNET

(57) ABSTRACT

A supporting structure includes a base, first and second arms, an operating member, first and second locking members, a rotating base, a bearing rack. One end of the first arm is rotatably provided at the base with a first longitudinal axis. The operating member is penetratingly disposed through the first arm and changed between locking/release positions. The first locking member is disposed in the first arm and changed between first outermost/innermost positions, with one end fixed to and acting synchronously with the operating member. The second locking member is disposed in the first arm. The rotating base is rotatably disposed at the other end of the first arm with a second longitudinal axis. One end of the second arm is rotatably connected to the rotating base with a horizontal axis. The bearing rack is connected to the other end of the second arm and includes a fixed frame.

19 Claims, 18 Drawing Sheets

SUPPORTING STRUCTURE

CROSS-REFERENCE TO RELATED APPLICATION

This application claims the priority benefit of Taiwan application serial no. 113200526, filed on Jan. 16, 2024. The entirety of the above-mentioned patent application is hereby incorporated by reference herein and made a part of this specification.

BACKGROUND OF THE INVENTION

Field of the Invention

The invention relates to a supporting structure, and in particular to a supporting structure for bearing a display.

Description of Related Art

U.S. Pat. No. 9,266,243 discloses an arm assembly having a locking system, which is applied to an electronic device such as an ultrasonic device. The arm assembly includes a base 22, an extension arm 24, and a lifting arm 28 pivotally connected to each other in sequence and includes a first locking member 32, a second locking member 33, and a third locking member 34 not connected to each other but may be interlocked with each other, thus allowing the base, the extension arm, and the lifting arm to be locked simultaneously.

When locking, the extension arm needs to be rotated to a specific position relative to the base, and the lifting arm needs to be rotated relative to the extension arm to a specific position. At this time, the lifting arm may be pressed down close to the extension arm, and a knob 35 is rotated to lock the third locking member. Since a tension spring 52 of the case has an over-point biasing effect on the first locking member and the second locking member at the same time, the size is greater (the torque is greater). However, to lock, users need to exert force with one hand to push the lifting arm down close to the extension arm, and use the other hand to rotate the knob. Excessive tension spring torque makes it difficult for the users to press down the lifting arm with one hand, making the operation more inconvenient; in addition, the pivot member 62 of the knob and the third locking member are connected via a short link 66, which may cause a dead point and cause jamming.

SUMMARY OF THE INVENTION

The invention provides a supporting structure including a buffer linkage and capable of changing between a first state and a second state, and performs a buffer stroke and a main traction stroke when changing between the first state and the second state.

A supporting structure of the invention is adapted to support a display. The supporting structure includes: a base, a first arm, an operating member, a first locking member, a second locking member, a rotating base, a second arm, and a bearing rack. One end of the first arm is rotatably provided at the base with a first longitudinal axis. The operating member is penetratingly disposed through the first arm and capable of moving between a locking position and a release position. The first locking member is disposed in the first arm and capable of moving between a first outermost position and a first innermost position, and one end thereof is fixed to the operating member and acting synchronously with the operating member. The second locking member is disposed in the first arm and includes a buffer linkage and a pin set. The buffer linkage is pivotally connected to the first locking member in conjunction, and capable of changing between a first state and a second state, and performs a buffer stroke and a main traction stroke when changing between the first state and the second state. The pin set is pivotally connected to the buffer linkage in conjunction and capable of moving between a second outermost position and a second innermost position. The rotating base is rotatably disposed at the other end of the first arm with a second longitudinal axis. One end of the second arm is rotatably connected to the rotating base with a horizontal axis. The bearing rack is adapted to dispose the display. The bearing rack is connected to the other end of the second arm and includes a fixed frame.

In particular, when the operating member is at the locking position, the first locking member is located at the first outermost position and partially protruded out of the first arm to be suitable for engaging with the fixed frame, so that the second arm is not able to tilt relative to the rotating base, and the buffer linkage is in the first state, and the pin set is at the second outermost position and partially protruded out of the first arm to be suitable for engaging with the base, so that the first arm is not able to swivel relative to the base.

In particular, when the operating member is in the release position, the first locking member is located at the first innermost position and received in the first arm, so that the first arm is able to swivel relative to the base, and the buffer linkage is in the second state, the pin set is at the second innermost position and received in the first arm, so that the second arm is able to tilt relative to the rotating base.

In particular, when the first locking member is changed from the first outermost position toward the first innermost position, and the buffer linkage first performs the buffer stroke, then performs the main traction stroke, and wherein during the buffer stroke, the first locking member is pivoted relative to the buffer linkage, and the pin set is located at the second outermost position, and during the main traction stroke, the buffer linkage drives the pin set to be changed from the second outermost position to the second innermost position.

In particular, the buffer linkage has a first link and a second link pivotally connected to each other, the first link is pivotally connected to the first locking member, the second link is pivotally connected to the pin set, the first link and the second link form an internal angle, and the internal angle is less than 180 degrees.

In particular, when the first locking member is changed from the first outermost position toward the first innermost position, during the buffer stroke, the first locking member drives the first link to pivot relative to the second link, and the second link does not substantially drive the pin set, the pin set remains at the second outermost position, while during the main traction stroke, the first locking member drives the first link and the second link, and the second link drives the pin set to move to the second innermost position.

In particular, the first link has a first head end and a first tail end, the second link has a second head end and a second tail end, the first head end is pivotally connected to the first locking member, the first tail end is pivotally connected to the second head end, the second tail end is pivotally connected to the pin set. During the buffer stroke, the first link and the second link are pivoted and the internal angle gradually becomes greater, the second tail end actually does not move, the pin set remains at the second outermost position, and during the main traction stroke, the first link is pivoted relative to the second link and the internal angle gradually becomes less, and the second tail end moves and drives the pin set to move to the second innermost position.

In particular, the first arm includes a housing, the operating member has a knob and a rotating shaft connected to each other, the first locking member includes a hollow body and a hook connected to each other, the knob is protruded beyond the housing, the rotating shaft is rotatably inserted into the housing, and the hollow body is sleeved at the rotating shaft.

In particular, the base includes a sleeve and a stopper, the stopper surrounds the sleeve, the pin set has a positioning tube, a pin, and a reset elastic member, the positioning tube is disposed at the first arm and communicates with the stopper, the pin is movably inserted into the positioning tube, and the reset elastic member is sleeved at the pin and respectively abutted against the positioning tube and the pin, so as to tend to make the pin partially protrude out of the positioning tube.

In particular, when the first locking member is located at the first outermost position and engaged with the fixed frame, and when the pin set is located at the second outermost position and engaged with a lock hole of the stopper, the first arm is not able to swivel relative to the base, and the second arm is not able to tilt relative to the rotating base. When the first locking member is located at the first innermost position and the pin set is located at the second innermost position, the first arm is able to swivel relative to the base, and the second arm is able to tilt relative to the rotating base.

In particular, when the positioning tube is misaligned with the lock hole of the stopper, the pin is blocked by the stopper, so that the pin is received in the positioning tube to compress the reset elastic member, and the pin pushes the first link and the second link to reduce the internal angle.

In particular, the hollow body and the hook are integrally formed and are rotatable synchronously.

In particular, the first locking member further includes a torsion spring, the hook is pivoted at the hollow body, and two ends of the torsion spring are respectively abutted against the hollow body and the hook.

In particular, the first arm further includes a positioning base and a main elastic member, the positioning base is adjacent to the base, and one end of the main elastic member is provided at the first locking member and the other end thereof is provided at the positioning base.

In particular, the main elastic member provides an elastic force so that the first locking member tends to remain at one of the first outermost position and the first innermost position, and the pin set tends to remain at one of the second outermost position and the second innermost position.

In particular, the fixed frame has a surrounding body and a hook hole defined by the surrounding body. When the first locking member is located at the first outermost position, and an external force is applied to rotate the second arm and cause the surrounding body to press the first locking member, the first locking member is pressed toward the first innermost position, so that the surrounding body is able to continuously press the first locking member and to approach the first arm. When the first locking member is pressed to be aligned with the hook hole, the surrounding body is unable to continuously press the first locking member, and the main elastic member drives the first locking member to return to the first outermost position and engages the first locking member with the hook hole.

In particular, the surrounding body has at least one guide slope adapted to guide the hook of the first locking member to be engaged with the hook hole.

In particular, the hook has a first width, the guide slope has a guide width, and the guide width is greater than the first width.

DESCRIPTION OF THE EMBODIMENTS

Figure 1A:
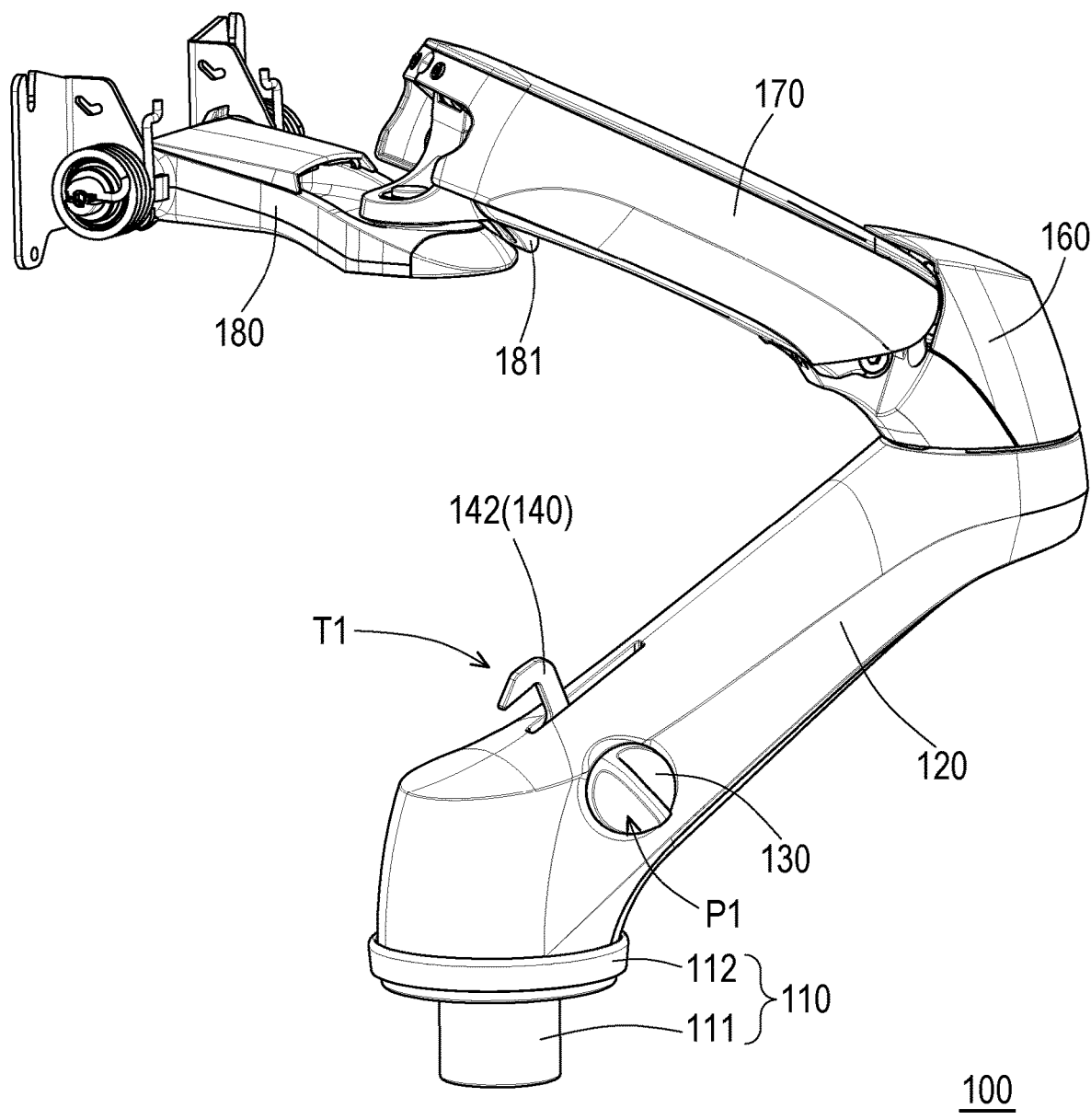
FIG. 1A is a schematic three-dimensional view of the unlocked state of the supporting structure of an embodiment of the invention.
Figure 1B:
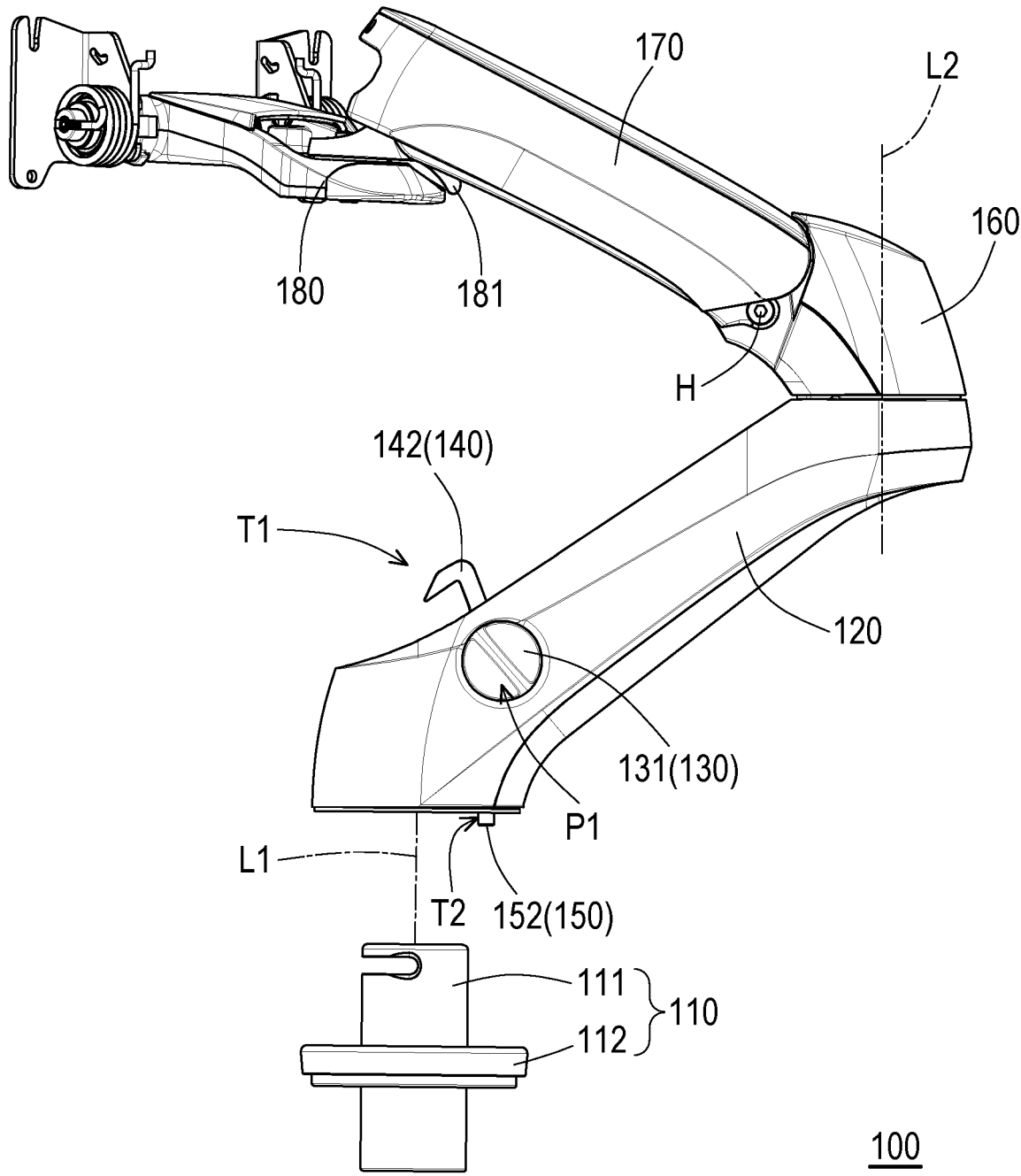
FIG. 1B is a schematic plan view of the unlocked state of the supporting structure of FIG. 1A.
Figure 1C:
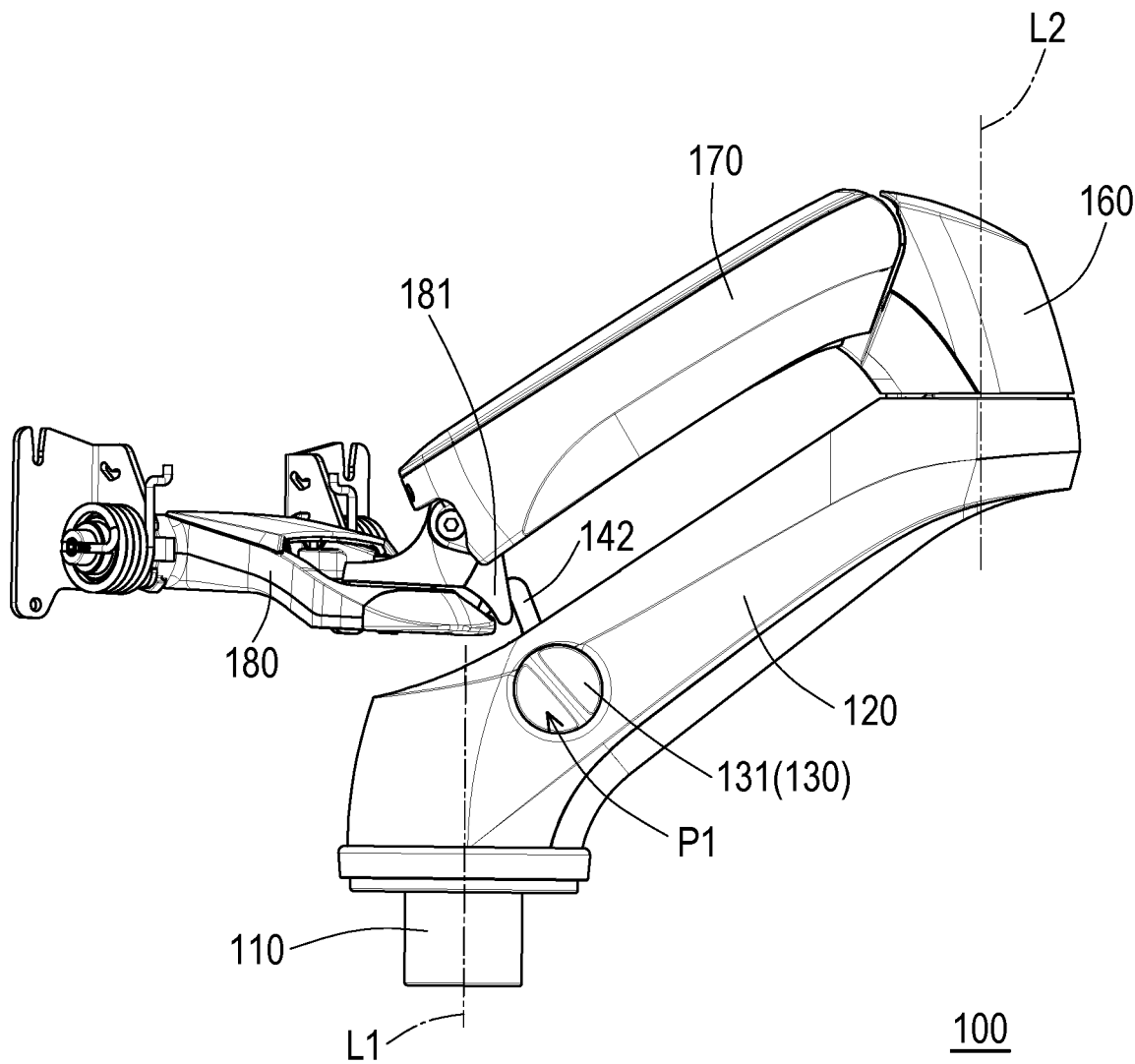
FIG. 1C is a schematic plan view of the locked state of the supporting structure of FIG. 1B.
Figure 1D:
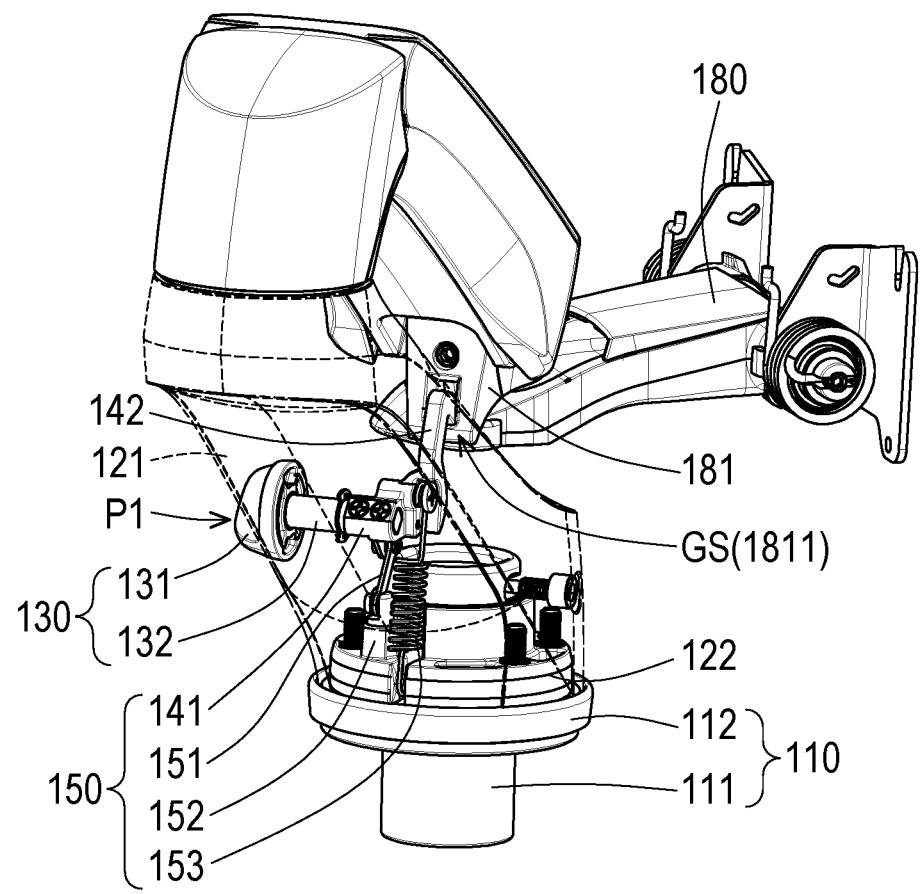
FIG. 1D is a schematic partial perspective three-dimensional view of the supporting structure of FIG. 1C in the locked state.
Figure 1E:
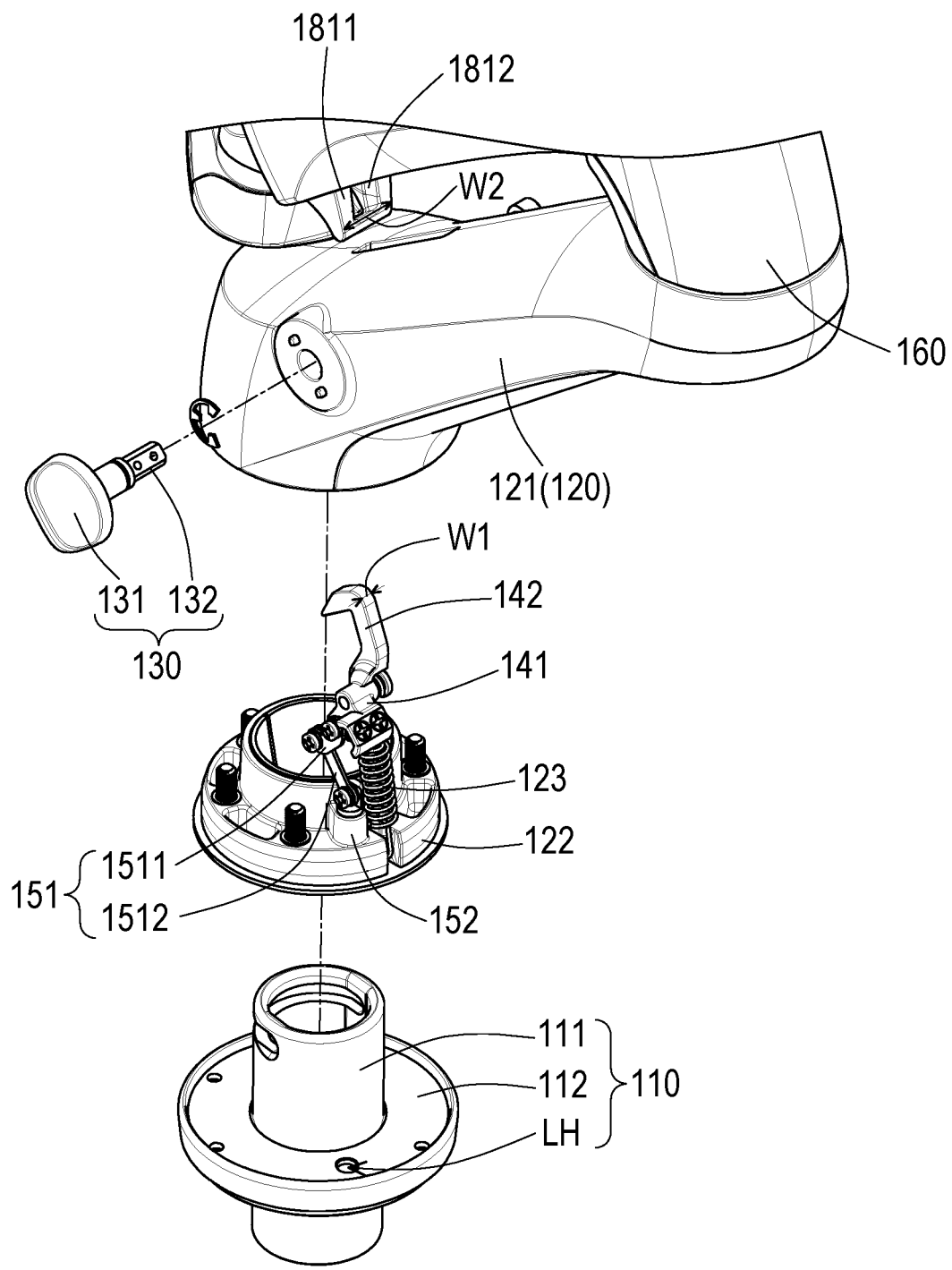
FIG. 1E is an exploded view of some elements of the supporting structure of FIG. 1C.

Referring to FIG. 1A, FIG. 1D, and FIG. 1E, a supporting structure 100 of the present embodiment is adapted to support a display (not shown in the figures), such as a computer screen, a television, or other similar display devices. The supporting structure 100 comprises a base 110, a first arm 120, an operating member 130, a first locking member 140, a second locking member 150, a rotating base 160, a second arm 170, and a bearing rack 180.

With reference to FIG. 1B and FIG. 1C, one end of the first arm 120 is rotatably provided at the base 110 with a first longitudinal axis L1 (roughly parallel to the direction of gravity). The operating member 130 is penetratingly disposed through the first arm 120 and capable of moving between a locking position P1 (see FIG. 2A) and a release position P2 (see FIG. 3A). The first locking member 140 is disposed in the first arm 120 and capable of moving between a first outermost position T1 (see FIG. 2A) and a first innermost position S1 (see FIG. 3A), and one end of the first locking member 140 is fixed to the operating member 130 and acting synchronously with the operating member 130. That is, when the operating member 130 is rotated relative to the first arm 120, the operating member 130 synchronously drives the first locking member 140 to rotate.

The second locking member 150 is disposed in the first arm 120 and includes a buffer linkage 151 and a pin set 152. The buffer linkage 151 is pivotally connected to the first locking member 140 in conjunction, and capable of changing between a first state C1 (see FIG. 2B) and a second state C2 (see FIG. 3B), and performs a buffer stroke and a main traction stroke when changing between the first state and the second state. The pin set 152 is pivotally connected to the buffer linkage 151 in conjunction and capable of moving between a second outermost position T2 (see FIG. 2B) and a second innermost position S2 (see FIG. 3B).

The rotating base 160 is rotatably provided at the other end of the first arm 120 away from the base 110 with a second longitudinal axis L2 (roughly parallel to the direction of gravity). One end of the second arm 170 is rotatably connected to the rotating base 160 with a horizontal axis H (roughly perpendicular to the direction of gravity), wherein the horizontal axis H is orthogonal to the first longitudinal axis L1 and the second longitudinal axis L2. The bearing rack 180 is connected to the other end of the second arm 170 away from the rotating base 160 and includes a fixed frame 181.

The bearing rack 180 is adapted to dispose a display.

Referring to FIG. 1C and FIG. 1D, when the operating member 130 is at the locking position P1, the first locking member 140 is located at the first outermost position T1 and partially protruded out of the first arm 120 and engaged with the fixed frame 181 of the bearing rack 180, so that the second arm 170 is folded at the first arm 120 and the second arm 170 is restricted by the first locking member 140 and the fixed frame 181 and is not able to tilt relative to the rotating base 160 along the horizontal axis H. At the same time, the buffer linkage 151 is in the first state C1, and the pin set 152 is at the second outermost position T2 and partially protruded out of the first arm 120 and engaged with the base 110, so that the first arm 120 is not able to swivel relative to the base 110.

Figure 3A:
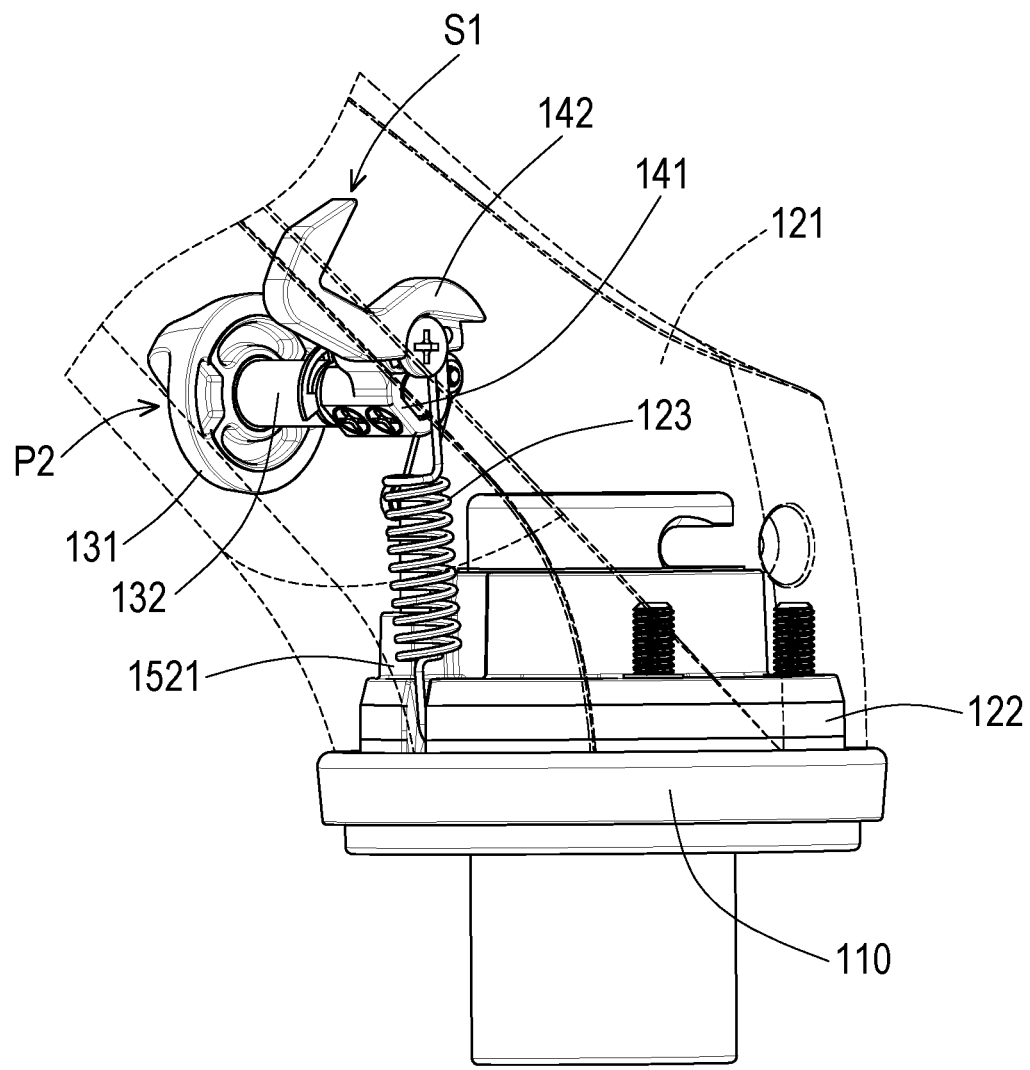
FIG. 3A is a schematic perspective three-dimensional view of some elements of the operating member of the supporting structure of FIG. 1D at the release position.
Figure 3B:
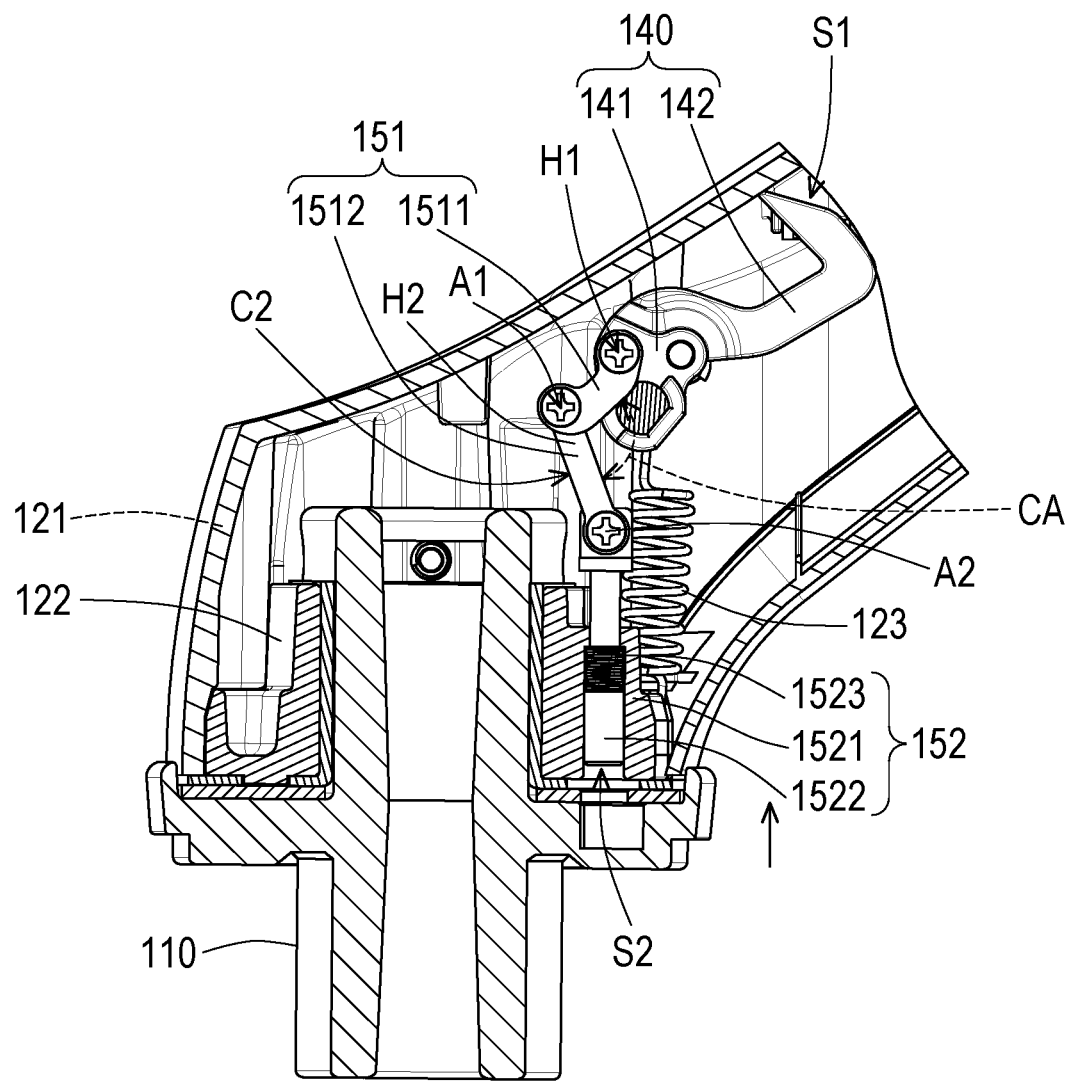
FIG. 3B is a schematic side view of some elements of the first locking member and the second locking member of the supporting structure of FIG. 3A entering the first arm.

Referring to FIG. 3A and FIG. 3B, when the operating member 130 is at the release position P2, the first locking member 140 is located at the first innermost position S1 and received in the first arm 120. The first arm 120 is able to swivel relative to the base 110, and the buffer linkage 151 is in the second state C2. The pin set 152 is at the second innermost position S2 and received in the first arm 120 so that the second arm 170 is able to tilt relative to the rotating base 160.

Figure 2A:
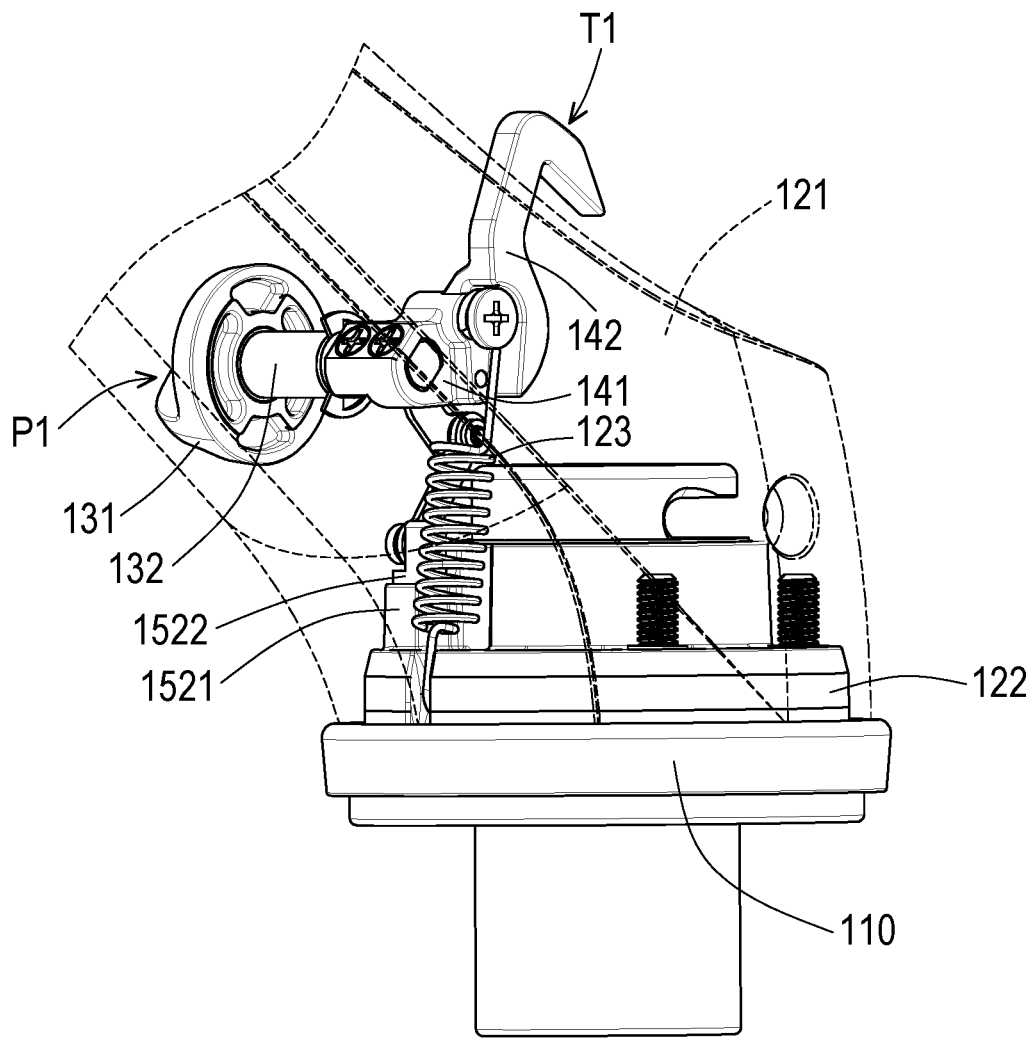
FIG. 2A is a schematic perspective three-dimensional view of some elements of the operating member of the supporting structure of FIG. 1D at the locking position.
Figure 2B:
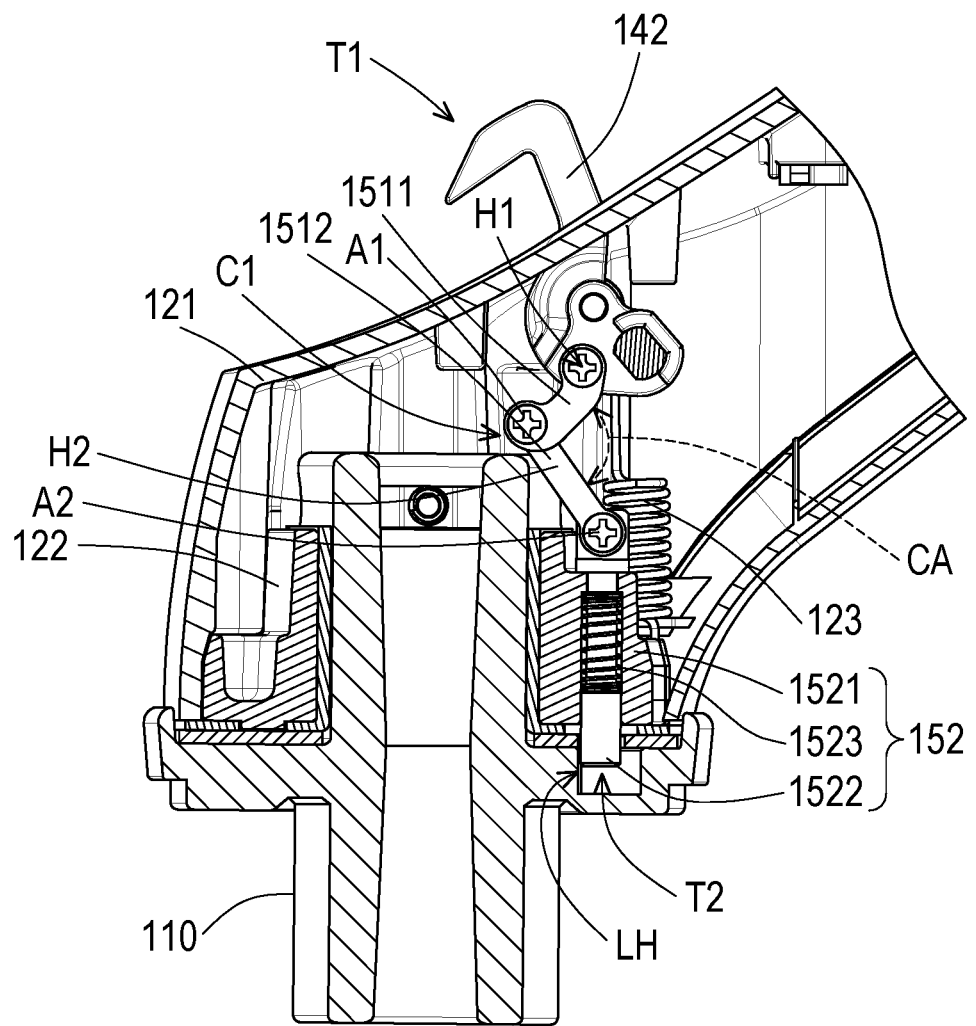
FIG. 2B is a schematic side view of some elements of the supporting structure of FIG. 2A when the pin set is engaged with the fixed frame.

Referring to FIG. 2B and FIG. 3B, the buffer linkage 151 has a first link 1511 and a second link 1512 pivotally connected to each other. The first link 1511 has a first head end H1 and a first tail end A1, and the second link 1512 has a second head end H2 and a second tail end A2. The first head end H1 of the first link 1511 is pivotally connected to the first locking member 140, the second tail end A2 of the second link 1512 is pivotally connected to the pin set 152, the first tail end A1 of the first link 1511 and the second head end H2 of the second link 1512 are pivotally connected to each other, and an internal angle CA between the first link 1511 and the second link 1512 is formed. The internal angle CA is always less than 180 degrees, so it is ensured that the first link 1511 and the second link 1512 may open and close smoothly relative to each other without dead points or overturning (the internal angle CA is greater than 180 degrees).

Referring to FIG. 2B, FIG. 2D, FIG. 2E, and FIG. 3B, when the first locking member 140 is changed from the first outermost position T1 toward the first innermost position S1, the buffer linkage 151 first performs a buffer stroke and then performs a main traction stroke. Referring to FIG. 2B, when the first locking member 140 is located at the first outermost position T1, the internal angle CA is about 101 degrees. During the buffer stroke, referring to FIG. 2D, the first locking member 140 is pivoted relative to the buffer linkage 151 and drives the first head end H1 (the end away from the second link 1512) of the first link 1511 to rotate clockwise, that is, move to the upper left direction in the figure. At the same time, the first tail end A1 of the first link 1511 drives the second head end H2 of the second link 1512 (the end adjacent to the first link 1511) to rotate clockwise. However, at this time, the second tail end A2 of the second link 1512 is only rotated but does not move (the relative position remains unchanged), so the pin set 152 does not move. In other words, during the buffer stroke shown in FIG. 2B to FIG. 2D, the internal angle CA between the first link 1511 and the second link 1512 gradually becomes greater (to about 158 degrees), and the pivot joint between the first tail end A1 and the second head end H2 is moved to the right in the figures. As a result, the pin set 152 remains stationary and is located at the second outermost position T2, so the buffer stroke is roughly equal to an idle stroke for the pin set 152.

Figure 2C:
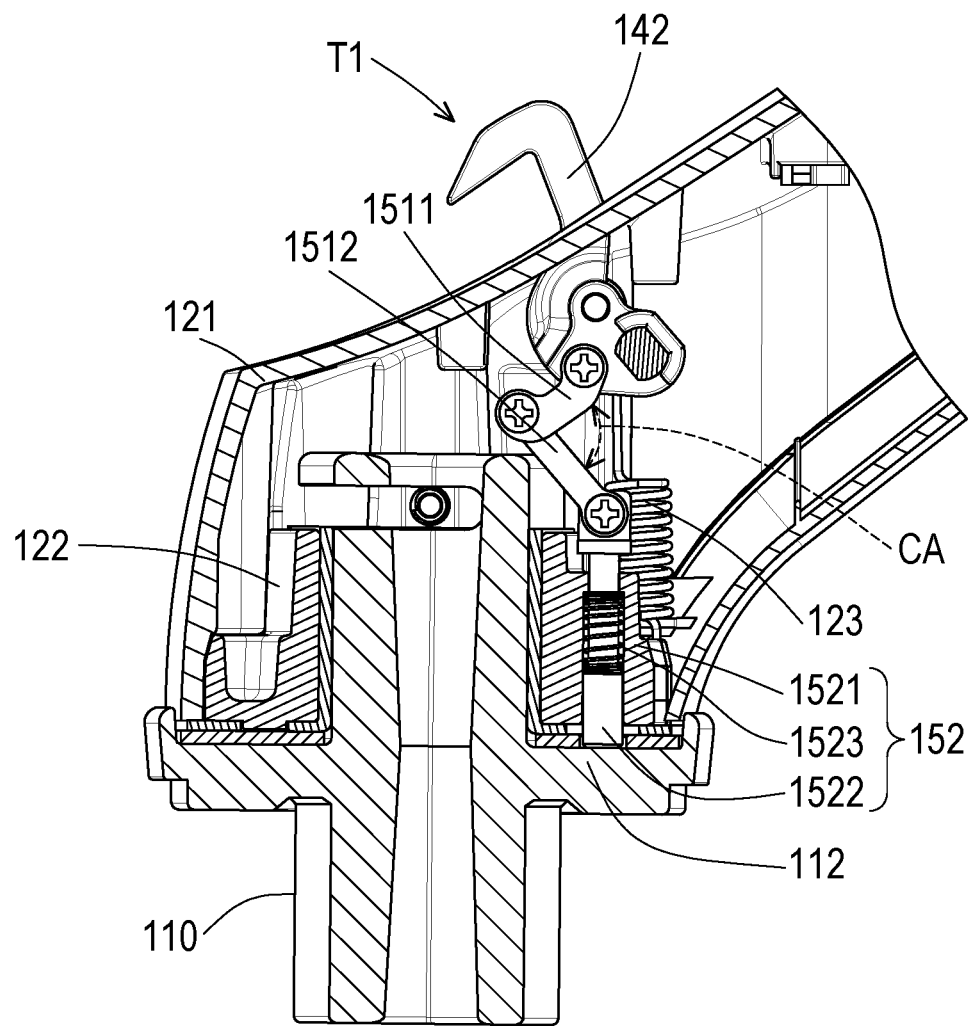
FIG. 2C is a schematic side view of some elements of the supporting structure of FIG. 2A when the pin set is abutted against the fixed frame.
Figure 2D:
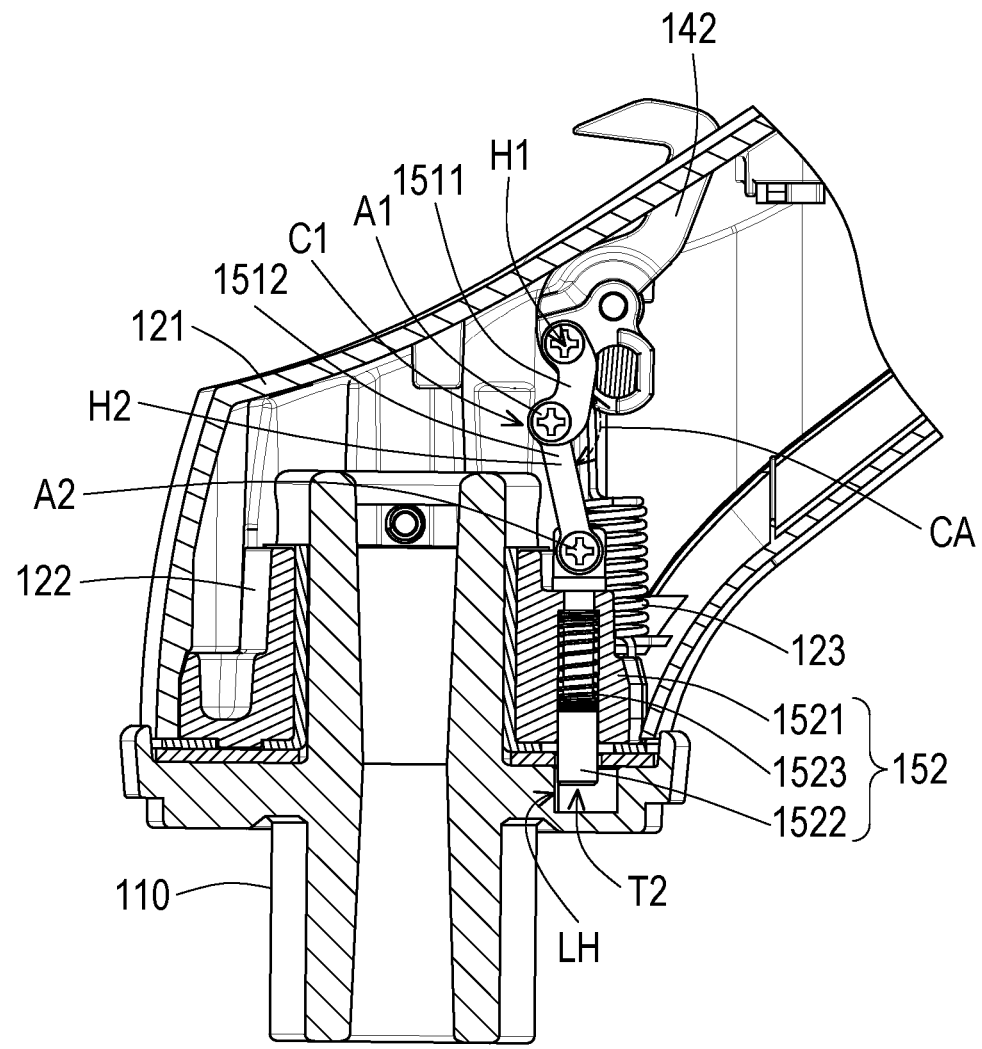
FIG. 2D is a schematic cross-sectional view of the buffer linkage of FIG. 2A switching to the buffer stroke.
Figure 2E:
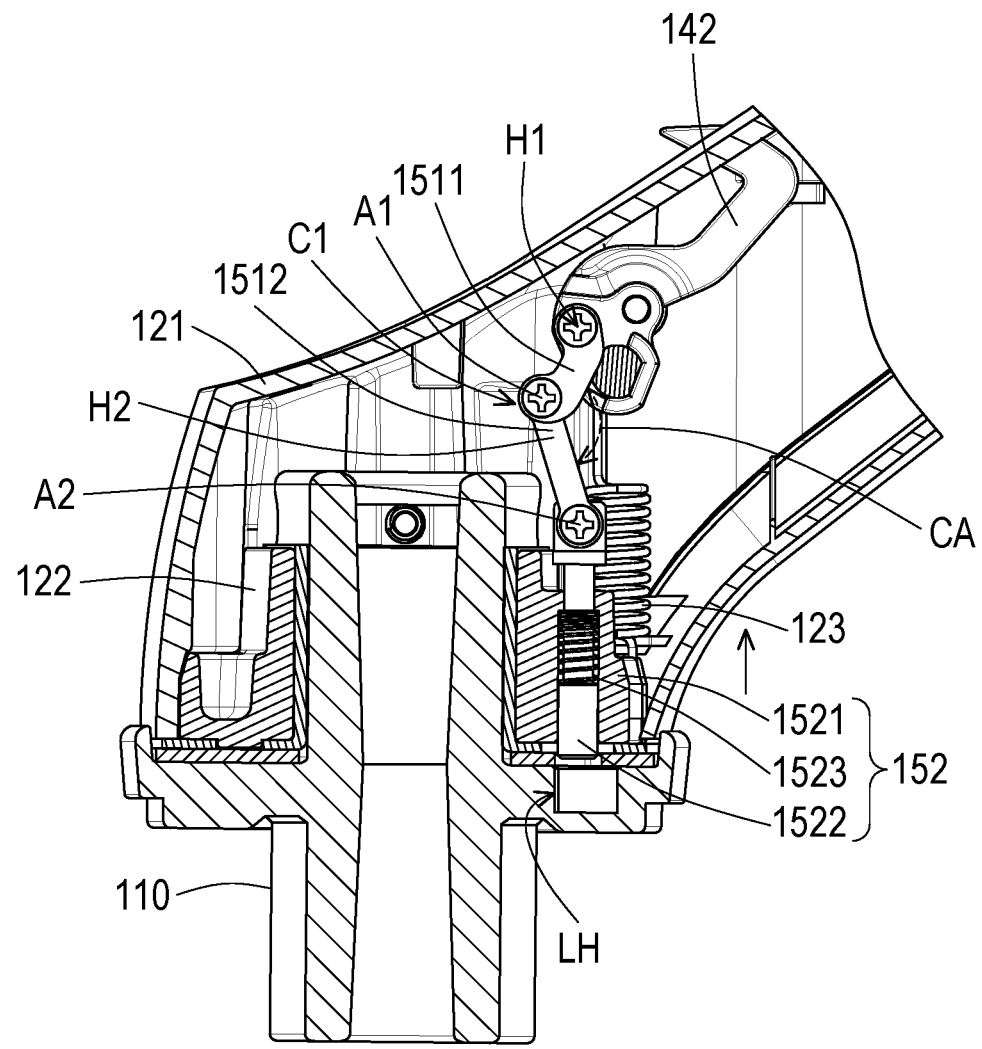
FIG. 2E is a schematic cross-sectional view of the buffer linkage of FIG. 2D switching to the main traction stroke.

Referring to FIG. 2D, when the internal angle CA reaches about 158 degrees, the buffer linkage 151 begins to enter the main traction stroke. Referring to FIG. 2E, at this time, the first link 1511 continues pivoting and at the same time drives the first head end H1 to move upward relatively (and eventually move toward the upper right direction in the figure), and continues to drive the second link 1512 to pivot and move upward, and the internal angle CA gradually becomes less (about 137 degrees as shown in FIG. 2E), and the second tail end A2 of the second link 1512 is rotated and moved (relatively moved upward), thereby driving the pin set 152 upward, that is, changing from the second outermost position T2 toward the second innermost position S2. Referring to FIG. 3B, at last, the first locking member 140 is changed from the first outermost position T1 to the first innermost position S1, and when the pin set 152 is changed to the second innermost position S2, the internal angle CA between the first link 1511 and the second link 1512 is reduced to about 112 degrees.

Furthermore, referring to FIG. 1B and FIG. 1C, when the first locking member 140 is located at the first outermost position T1 and partially protruded out of the first arm 120, at this time, the second arm 170 is unfolded at the first arm 120. Users may directly fold the second arm 170 at the first arm 120, and the second arm 170 drives the fixed frame 181 to push against the first locking member 140, so that the first locking member 140 triggers the buffer stroke of the buffer linkage 151 and does not affect the position of the pin set 152 during the buffer stroke. Referring to FIG. 1C, after the fixed frame 181 passes through the first locking member 140, they are able to be engaged with each other and switch to the locked state. Since the present embodiment has a buffer stroke, the first locking member 140 may first be protruded out of the first arm 120 and then fold the second arm 170.

Referring to FIG. 1D, FIG. 1E, and FIG. 2A, the first arm 120 includes a housing 121, a positioning base 122, and a main elastic member 123. The positioning seat 122 is adjacent to the base 110. One end of the main elastic member 123 is provided at the first locking member 140, and the other end thereof is provided at the positioning seat 122. Compared with the conventional art, the size of the main elastic member 123 is effectively reduced to reduce costs and improve safety.

The main elastic member 123 adopts a tension spring and provides an elastic force, so that the first locking member 140 tends to remain at one of the first outermost position T1 and the first innermost position S1, and the pin set 152 tends to remain at one of the second outermost position T2 and the second innermost position S2.

In short, referring to FIG. 2B, FIG. 2D, and FIG. 3B, in FIG. 2D, the main elastic member 123 (tension spring) has the longest stretched length. In FIG. 2B or FIG. 3B, the main elastic member 123 (tension spring) has a shorter stretched length, thus producing an over-point bias effect. Specifically, when the degree of the first locking member 140 protruded from the first arm 120 is greater than a critical value (i.e., FIG. 2B), the elastic force of the main elastic member 123 pulls the first locking member 140 so that the first locking member 140 remains at the first outermost position T1, that is, tends to be changed from FIG. 2D to FIG. 2B. When the degree of the first locking member 140 protruded from the first arm 120 is less than a critical value (i.e., FIG. 3B), the elastic force of the main elastic member 123 directly drives the first locking member 140 to be received in the first arm 120 and located in the first innermost position S1, that is, tends to be changed from 2D to FIG. 3B.

The operating member 130 has a knob 131 and a rotating shaft 132 connected to each other. The knob 131 is protruded beyond the outside of the housing 121, and the rotating shaft 132 is rotatably inserted into the housing 121. The first locking member 140 includes a hollow body 141 and a hook 142 connected to each other. The hollow body 141 is sleeved at the rotating shaft 132 and connected to each other via a fastener.

Furthermore, the hollow body 141 and the hook 142 are integrally formed and are rotatable synchronously. Therefore, when the knob 131 is rotated relative to the housing 121 to change between the locking position P1 (see FIG. 2A) and the release position P2 (see FIG. 3A), the knob 131 drives the hook 142 to be changed between the first outermost position T1 and the first innermost position S1 via the rotating shaft 132 and the hollow body 141.

Referring to FIG. 1E, FIG. 2A, and FIG. 2B, the base 110 includes a sleeve 111 and a stopper 112. The stopper 112 surrounds the sleeve 111. The pin set 152 has a positioning tube 1521, a pin 1522, and a reset elastic member 1523. The positioning tube 1521 is disposed in the first arm 120 and communicates with the stopper 112. The pin 1522 is movably inserted into the positioning tube 1521, the reset elastic member 1523 is sleeved at the pin 1522 and abutted against the positioning tube 1521 and the pin 1522 respectively, so as to tend to make the pin 1522 to partially protrude out of the positioning tube 1521.

Referring to FIG. 1C and FIG. 2B, when the hook 142 of the first locking member 140 is located at the first outermost position T1 and engaged with the fixed frame 181, the second arm 170 is not able to tilt relative to the rotating base 160. When the pin 1522 of the pin set 152 is located at the second outermost position T2 and engaged with a lock hole LH of the stopper 112, the first arm 120 is not able to swivel relative to the base 110.

Referring to FIG. 3A and FIG. 3B, when the hook 142 of the first locking member 140 is located at the first innermost position S1, the second arm 170 is able to tilt relative to the rotating base 160. When the pin 1522 of the pin set 152 is located at the second innermost position S2, the first arm 120 is rotatable able to swivel relative to the base 110.

Referring to FIG. 2B, under the premise that the hook 142 of the first locking member 140 is located at the first outermost position T1 and the pin 1522 of the pin set 152 is located at the second outermost position T2, referring to FIG. 2C, when the positioning tube 1521 of the pin set 152 is misaligned with the lock hole LH of the stopper 112, the pin 1522 is blocked by the stopper 112, so that the pin 1522 is received in the positioning tube 1521 to compress the reset elastic member 1523, and the pin 1522 pushes the first link 1511 and the second link 1512 to pivot with each other to reduce the internal angle CA. In this case, the hook 142 of the first locking member 140 is still located at the first outermost position T1, and the pin 1522 leaves the second outermost position T2.

Furthermore, referring to FIG. 2B, when the positioning tube 1521 of the pin set 152 is again aligned with the lock hole LH of the stopper 112, the reset elastic member 1523 elastically recovers to push the pin 1522 to engage the lock hole LH of the stopper 112 and drive the first link 1511 and the second link 1512 to pivot with each other to increase the internal angle CA.

Referring to FIG. 1B to FIG. 1D, the fixed frame 181 has a surrounding body 1811 and a hook hole 1812 defined by the surrounding body 1811. The surrounding body 1811 has at least one guide slope GS suitable for guiding the hook 142 to be engaged with the hook hole 1812. The hook 142 has a first width W1, the guide slope GS has a guide width W2, and the guide width W2 is greater than the first width W1. In particular, as the guide width W2 is greater, the offset degree between the surrounding body 1811 and the hook 142 is increased. That is, even if the guide hook 142 and the hook hole 1812 are not aligned, they are able to still be guided and engaged by the guide slope GS.

Specifically, when the first locking member 140 is located at the first outermost position T1, an external force is applied to rotate the second arm 170 and cause the surrounding body 1811 to press the hook 142 of the first locking member 140. The first locking member 140 is pressed toward the first innermost position S1, whereby the surrounding body 1811 may continuously press the first locking member 140 and to approach the first arm 120. Referring to FIG. 1C, when the surrounding body 1811 presses the hook 142 of the first locking member 140 to be aligned with the hook hole 1812, the surrounding body 1811 is unable to continuously press the hook 142 of the first locking member 140. Therefore, the main elastic member 123 drives the hook 142 of the first locking member 140 to return to the first outermost position T1, and causes the hook 142 of the first locking member 140 to be engaged with the hook hole 1812.

Since the present application has the buffer linkage 151 that may first perform the buffer stroke, the hook 142 may be first driven to the first outermost position T1 by rotating the knob 131, and then the second arm 170 is pressed down using both hands, thus facilitating the operation. Moreover, due to the guide slope GS, the second arm 170 may be locked as long as the second arm 170 is roughly aligned with the first arm 120. Therefore, there is no need to dispose another locking member between the first arm 120 and the second arm 170 as in the conventional art.

Figure 4A:
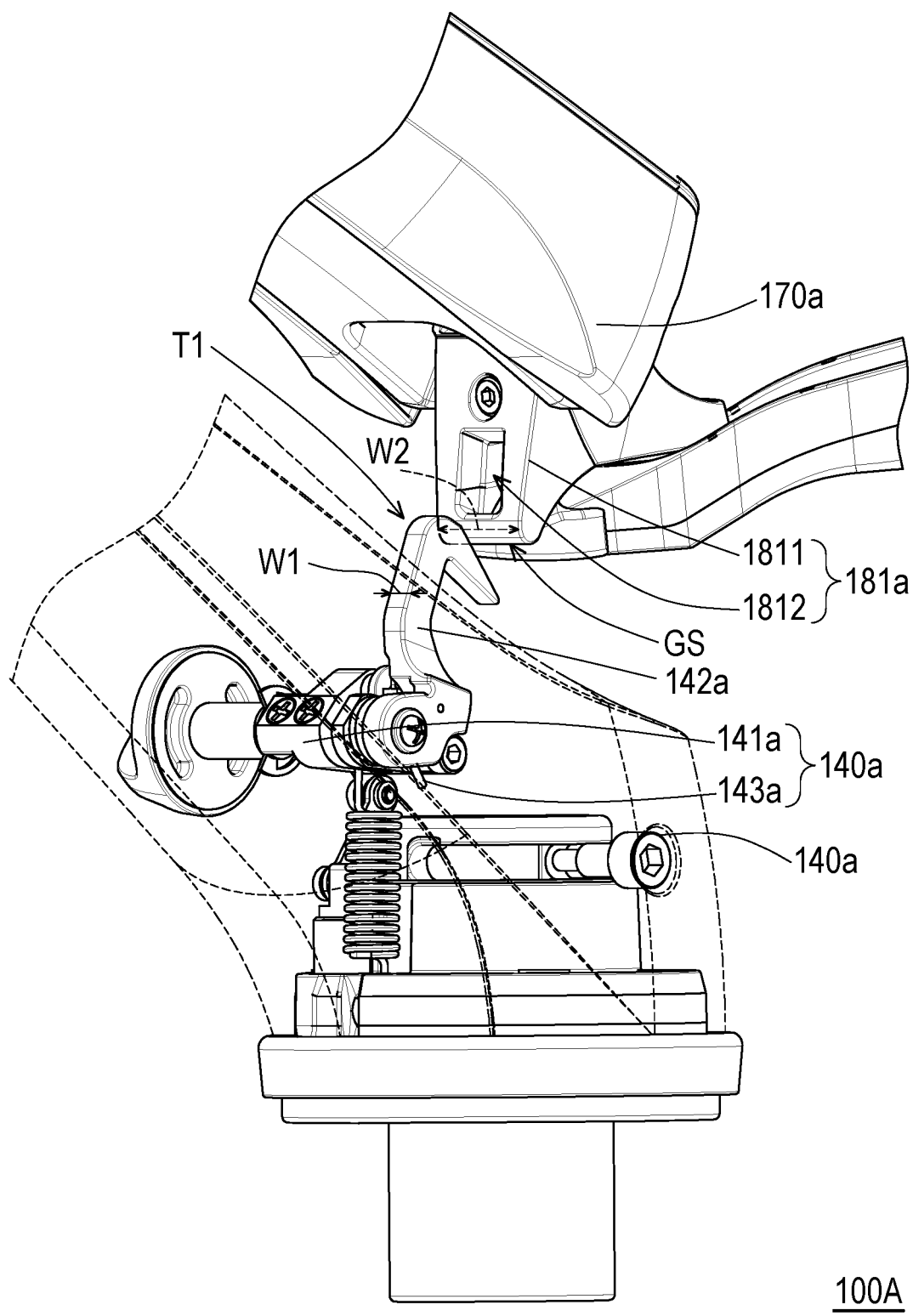
FIG. 4A is a schematic three-dimensional view of some elements of the supporting structure of another embodiment of the invention.
Figure 4B:
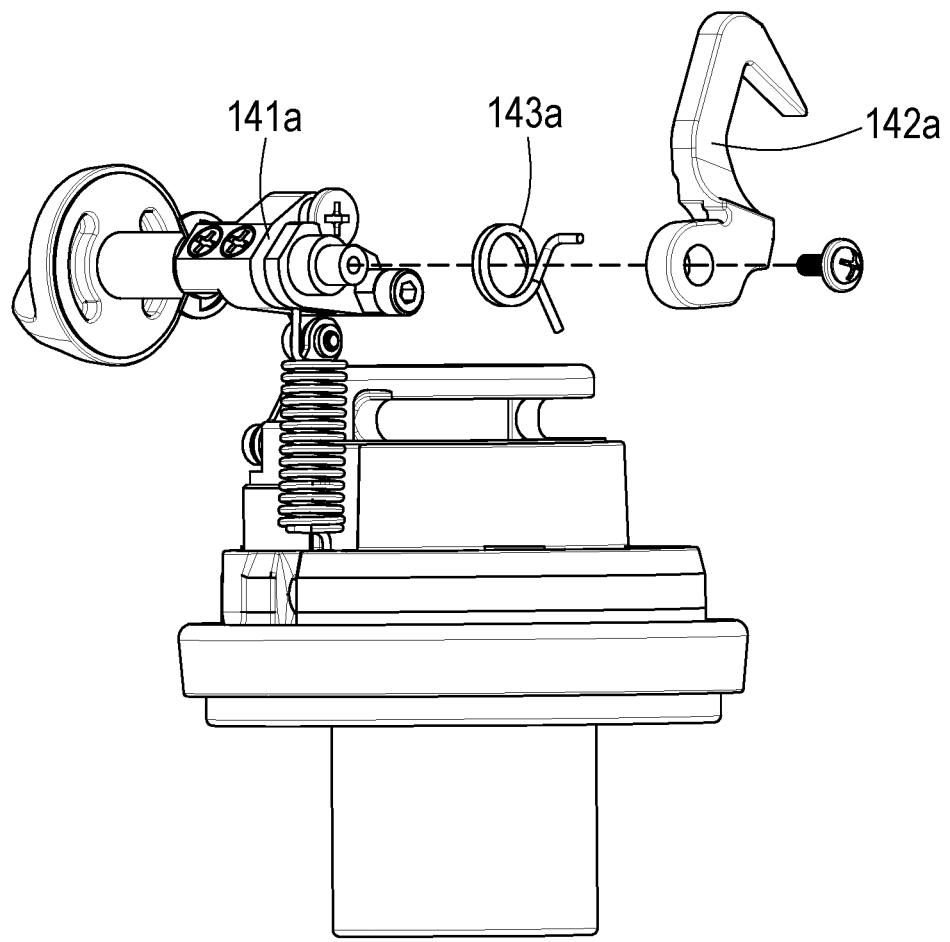
FIG. 4B is an exploded view of some elements of the supporting structure of FIG. 4A.

FIG. 4A is a schematic three-dimensional view of some elements of the supporting structure of another embodiment of the invention. FIG. 4B is an exploded view of some elements of the supporting structure of FIG. 4A. FIG. 5A to FIG. 5D are schematic views of the action of the first locking member of FIG. 4A engaged with the fixed frame.

Referring to FIG. 4A and FIG. 4B, the first locking member 140a of the supporting structure 100A of the present embodiment further includes a torsion spring 143a, and the hook 142a is pivoted at the hollow body 141a. Two ends of the torsion spring 143a are respectively abutted against the hollow body 141a and the hook 142a. The fixed frame 181a has the surrounding body 1811 and the hook hole 1812 defined by the surrounding body 1811. The surrounding body 1811 has at least one guide slope GS suitable for guiding the hook 142a to be engaged with the hook hole 1812. The hook 142 has the first width W1, the guide slope GS has the guide width W2, and the guide width W2 is greater than the first width W1. Other relevant details are as in the previous embodiment and are not described again.

Figure 5A:
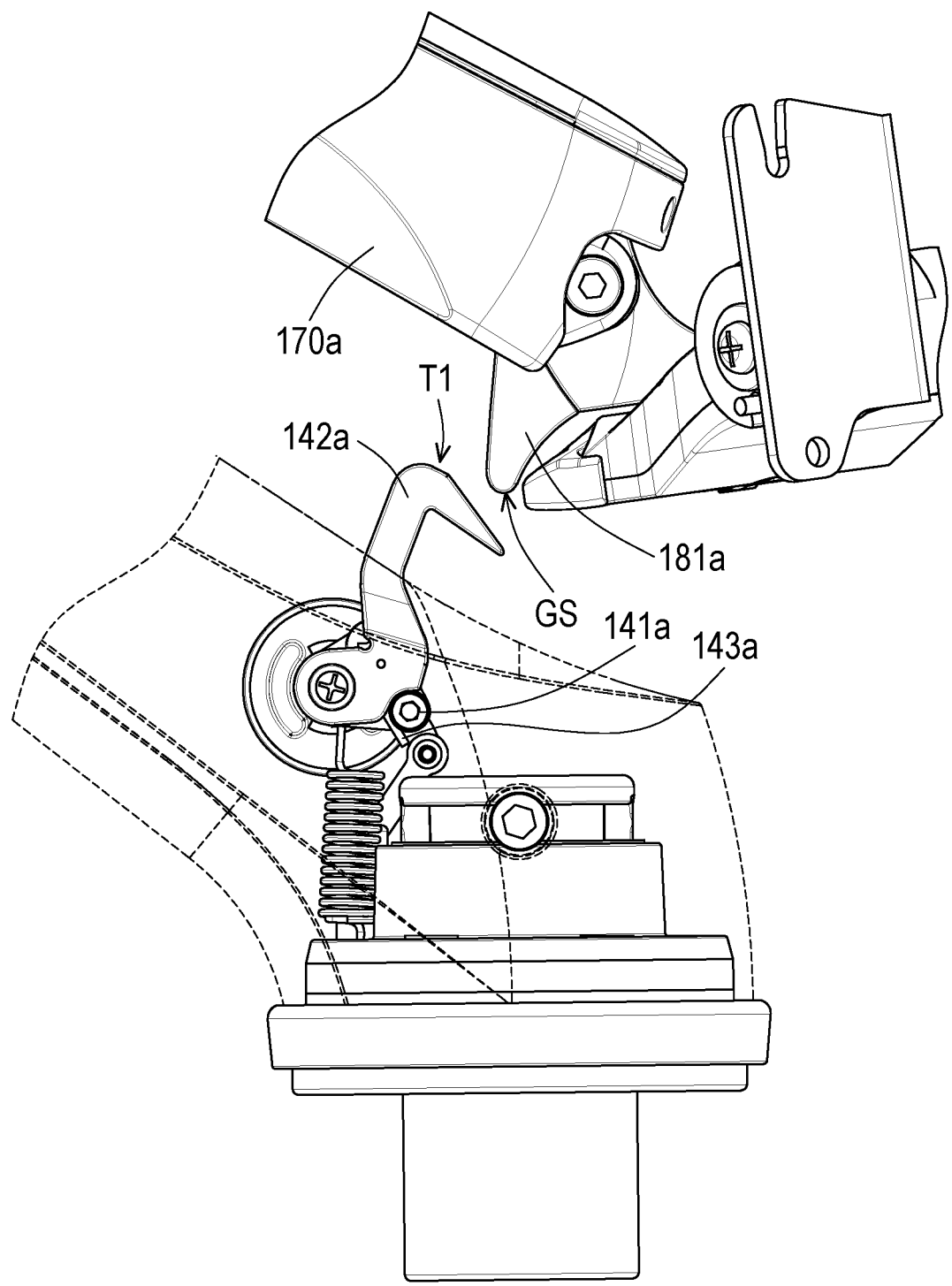
FIG. 5A to FIG. 5D are schematic views of the action of the first locking member of FIG. 4A engaged with the fixed frame.
Figure 5B:
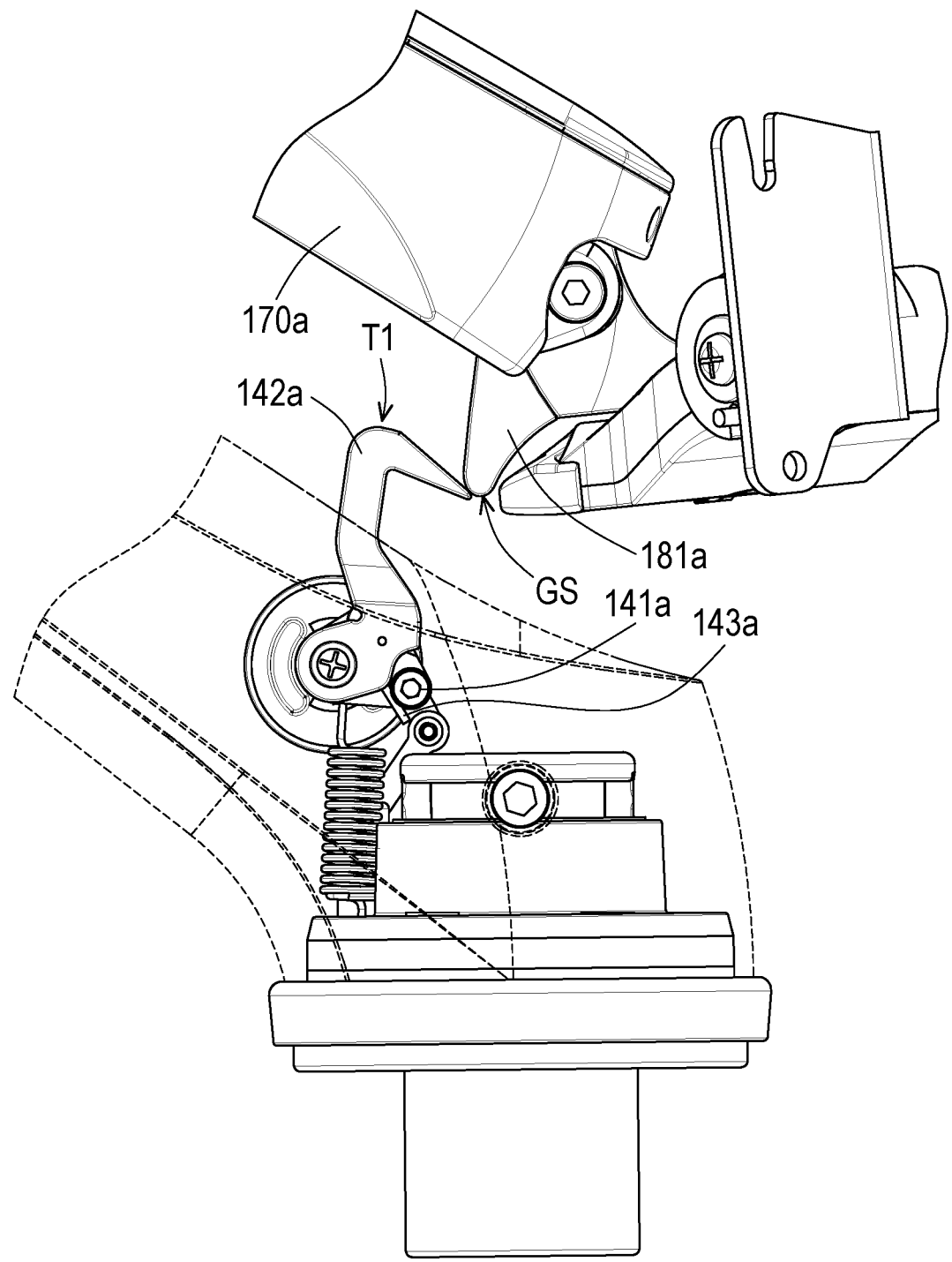
Figure 5C:
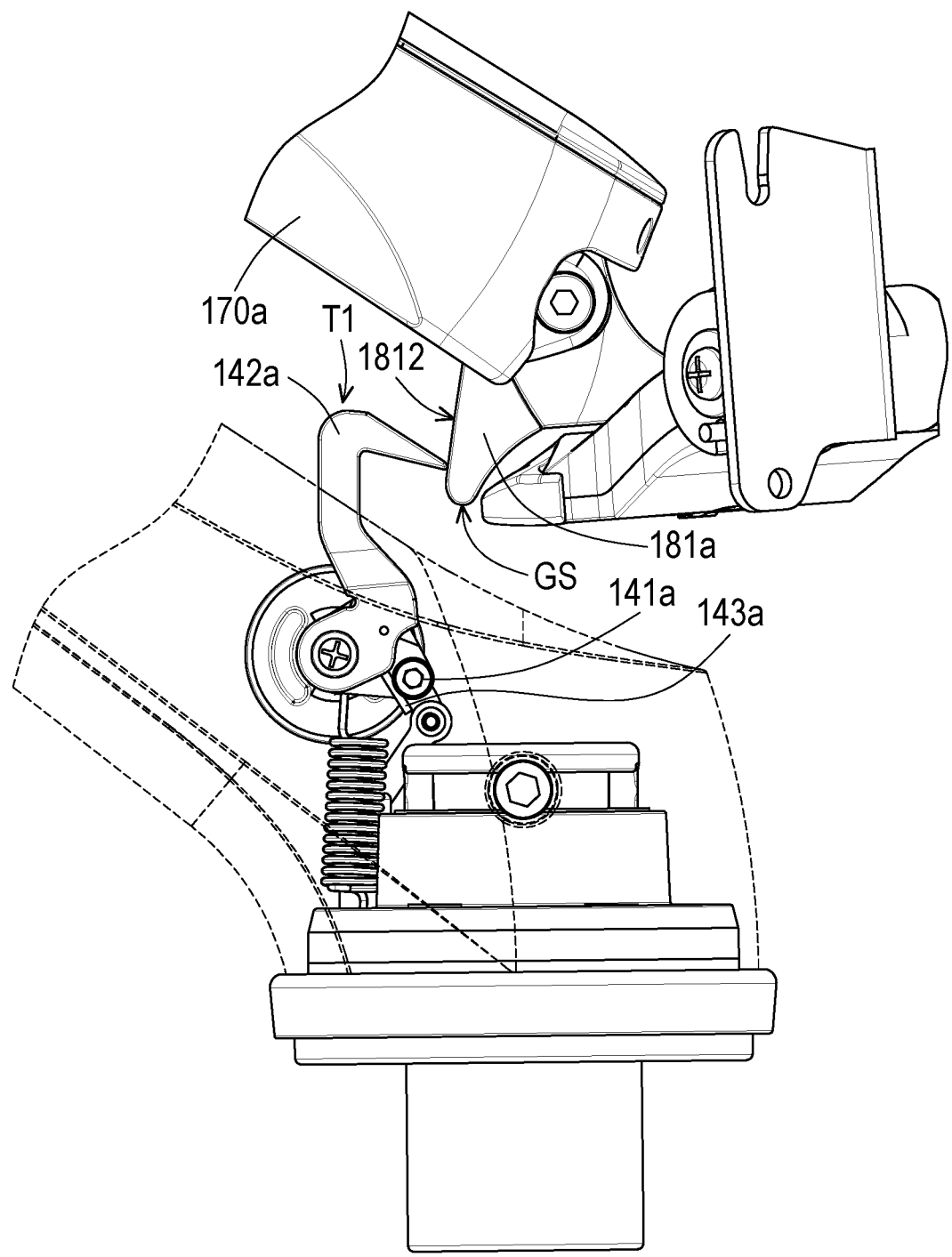
Figure 5D:
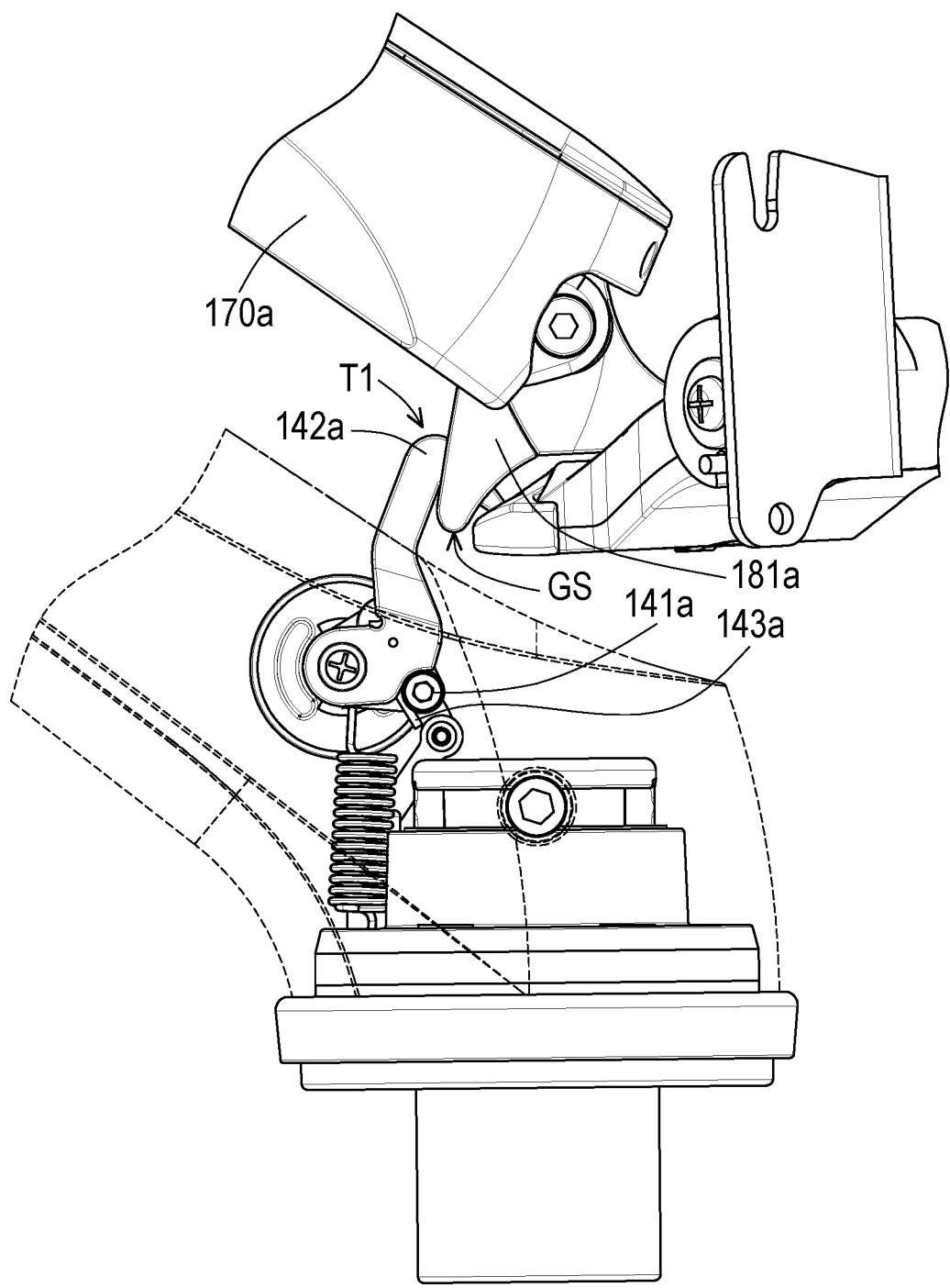

Referring to FIG. 5A to FIG. 5C, when the first locking member 140a is located at the first outermost position T1, an external force is applied to rotate the second arm 170a and cause the surrounding body 1811 to press the hook 142a of the first locking member 140a. The hook 142a of the first locking member 140a is pressed toward the first innermost position S1 and the hook 142a is pivoted relative to the hollow body 141a to stretch the torsion spring 143a. Thereby, the surrounding body 1811 may continuously press the first locking member 140a and to approach the first arm 120a. Referring to FIG. 5D, when the surrounding body 1811 presses the hook 142a of the first locking member 140a to be aligned with the hook hole 1812, the surrounding body 1811 is unable to continuously press the hook 142a of the first locking member 140. Therefore, the torsion spring 143a elastically recovers to drive the hook 142a of the first locking member 140a to return to the first outermost position T1, and causes the hook 142a of the first locking member 140a to be engaged with the hook hole 1812.

Based on the above, the supporting structure of the invention is adapted to support a display. The first arm is able to swivel relative to the base to adjust the angle, and the second arm may be expanded relative to the first arm to adjust the height. The users switch the supporting structure to the locked state or the unlocked state via the operating member. In the locked state, the operating member drives the first locking member to be partially protruded out of the first arm to be suitable for engaging with the fixed frame, so that the second arm is not able to tilt relative to the rotating base, and the pin set of the second locking member is partially protruded out of the first arm to be suitable for engaging with the base, so that the first arm is not able to swivel relative to the base. In the unlocked state, the operating member drives the first locking member to be received in the first arm, so that the first arm is able to swivel relative to the base, and the pin set of the second locking member is received in the first arm, so that the second arm is able to tilt relative to the rotating base.

What is claimed is:

1. A supporting structure, configured to support a display, the supporting structure comprising:
   a base;
   a first arm, wherein one end thereof is rotatably provided at the base with a first longitudinal axis;
   an operating member penetratingly disposed through the first arm and capable of moving between a locking position and a release position;
   a first locking member disposed in the first arm and capable of moving between a first outermost position and a first innermost position, and one end thereof fixed to the operating member and acting synchronously with the operating member;
   a second locking member disposed in the first arm and including:
      a buffer linkage pivotally connected to the first locking member in conjunction, and capable of changing between a first state and a second state, and performing a buffer stroke and a main traction stroke when changing between the first state and the second state, and
      a pin set pivotally connected to the buffer linkage in conjunction and capable of moving between a second outermost position and a second innermost position;
   a rotating base rotatably disposed at the other end of the first arm with a second longitudinal axis;
   a second arm, wherein one end thereof is rotatably connected to the rotating base with a horizontal axis; and
   a bearing rack adapted to dispose the display, and connected to the other end of the second arm and including a fixed frame,
   wherein when the operating member is at the locking position, the first locking member is located at the first outermost position and partially protruded out of the first arm to be suitable for engaging with the fixed frame, so that the second arm is not able to tilt relative to the rotating base, and the buffer linkage is in the first state, the pin set is at the second outermost position and partially protruded out of the first arm, to be suitable for engaging with the base, so that the first arm is not able to swivel relative to the base;
   wherein when the operating member is at the release position, the first locking member is located at the first innermost position and received in the first arm, so that the second arm is able to tilt relative to the rotating base, and the buffer linkage is in the second state, the pin set is at the second innermost position and received in the first arm, so that the first arm is able to swivel relative to the base;
   wherein when the first locking member is changed from the first outermost position toward the first innermost position, and the buffer linkage first performs the buffer stroke, then performs the main traction stroke, and wherein during the buffer stroke, the first locking member is pivoted relative to the buffer linkage, and the pin set is located at the second outermost position, and during the main traction stroke, the buffer linkage drives the pin set to be changed from the second outermost position to the second innermost position;
   wherein the first arm includes a positioning base and a main elastic member, the positioning base is adjacent to the base, and one end of the main elastic member is provided at the first locking member and the other end thereof is provided at the positioning base.

2. The supporting structure of claim 1, wherein the buffer linkage has a first link and a second link pivotally connected to each other, the first link is pivotally connected to the first locking member, the second link is pivotally connected to the pin set, the first link and the second link form an internal angle, and the internal angle is less than 180 degrees.

3. The supporting structure of claim 2, wherein when the first locking member is changed from the first outermost position toward the first innermost position, during the buffer stroke, the first locking member drives the first link to pivot relative to the second link, and the second link does not substantially drive the pin set, the pin set remains at the second outermost position, while during the main traction stroke, the first locking member drives the first link and the second link, and the second link drives the pin set to move to the second innermost position.

4. The supporting structure of claim 3, wherein the first link has a first head end and a first tail end, the second link has a second head end and a second tail end, the first head end is pivotally connected to the first locking member, the first tail end is pivotally connected to the second head end, the second tail end is pivotally connected to the pin set, and wherein during the buffer stroke, the first link and the second link are pivoted and the internal angle gradually becomes greater, the second tail end actually does not move, the pin set remains at the second outermost position, and during the main traction stroke, the first link is pivoted relative to the second link and the internal angle gradually becomes less, and the second tail end moves and drives the pin set to move to the second innermost position.

5. The supporting structure of claim 4, wherein the first arm includes a housing, the operating member has a knob and a rotating shaft connected to each other, the first locking member includes a hollow body and a hook connected to each other, the knob is protruded beyond the housing, the rotating shaft is rotatably inserted into the housing, and the hollow body is sleeved at the rotating shaft.

6. The supporting structure of claim 5, wherein the base includes a sleeve and a stopper, the stopper surrounds the sleeve, the pin set has a positioning tube, a pin, and a reset elastic member, the positioning tube is disposed at the first arm and communicates with the stopper, the pin is movably inserted into the positioning tube, and the reset elastic member is sleeved at the pin and respectively abutted against the positioning tube and the pin, so as to tend to make the pin partially protrude out of the positioning tube.

7. The supporting structure of claim 6, wherein when the first locking member is located at the first outermost position and engaged with the fixed frame, and when the pin set is located at the second outermost position and engaged with a lock hole of the stopper, the first arm is not able to swivel relative to the base, and the second arm is not able to tilt relative to the rotating base, and wherein when the first locking member is located at the first innermost position and the pin set is located at the second innermost position, the first arm is able to swivel relative to the base, and the second arm is able to tilt relative to the rotating base.

8. The supporting structure of claim 7, wherein when the positioning tube is misaligned with the lock hole of the stopper, the pin is blocked by the stopper, so that the pin is received in the positioning tube to compress the reset elastic member, and the pin pushes the first link and the second link to reduce the internal angle.

9. The supporting structure of claim 7, wherein the hollow body and the hook are integrally formed and are rotatable synchronously.

10. The supporting structure of claim 7, wherein the first locking member further includes a torsion spring, the hook is pivoted at the hollow body, and two ends of the torsion spring are respectively abutted against the hollow body and the hook.

11. The supporting structure of claim 1, wherein the main elastic member provides an elastic force so that the first locking member tends to remain at one of the first outermost position and the first innermost position, and the pin set tends to remain at one of the second outermost position and the second innermost position.

12. The supporting structure of claim 1, wherein the fixed frame has a surrounding body and a hook hole defined by the surrounding body, wherein when the first locking member is located at the first outermost position, and an external force is applied to rotate the second arm and cause the surrounding body to press the first locking member, the first locking member is pressed toward the first innermost position, so that the surrounding body is able to continuously press the first locking member and to approach the first arm, and wherein when the first locking member is pressed to be aligned with the hook hole, the surrounding body is unable to continuously press the first locking member, and the main elastic member drives the first locking member to return to the first outermost position and engages the first locking member with the hook hole.

13. The supporting structure of claim 12, wherein the surrounding body has at least one guide slope adapted to guide the hook of the first locking member to be engaged with the hook hole.

14. The supporting structure of claim 13, wherein the hook has a first width, the guide slope has a guide width, and the guide width is greater than the first width.

15. A supporting structure, configured to support a display, the supporting structure comprising:
a base;
a first arm, wherein one end thereof is rotatably provided at the base with a first longitudinal axis;
an operating member penetratingly disposed through the first arm and capable of moving between a locking position and a release position;
a first locking member disposed in the first arm and capable of moving between a first outermost position and a first innermost position, and one end thereof fixed to the operating member and acting synchronously with the operating member;
a second locking member disposed in the first arm and including:
a buffer linkage pivotally connected to the first locking member in conjunction, and capable of changing between a first state and a second state, and performing a buffer stroke and a main traction stroke when changing between the first state and the second state, and
a pin set pivotally connected to the buffer linkage in conjunction and capable of moving between a second outermost position and a second innermost position;
a rotating base rotatably disposed at the other end of the first arm with a second longitudinal axis;
a second arm, wherein one end thereof is rotatably connected to the rotating base with a horizontal axis; and
a bearing rack adapted to dispose the display, and connected to the other end of the second arm and including a fixed frame,
wherein when the operating member is at the locking position, the first locking member is located at the first outermost position and partially protruded out of the first arm to be suitable for engaging with the fixed frame, so that the second arm is not able to tilt relative to the rotating base, and the buffer linkage is in the first state, the pin set is at the second outermost position and partially protruded out of the first arm, to be suitable for engaging with the base, so that the first arm is not able to swivel relative to the base;
wherein when the operating member is at the release position, the first locking member is located at the first innermost position and received in the first arm, so that the second arm is able to tilt relative to the rotating base, and the buffer linkage is in the second state, the pin set is at the second innermost position and received in the first arm, so that the first arm is able to swivel relative to the base;

wherein when the first locking member is changed from the first outermost position toward the first innermost position, and the buffer linkage first performs the buffer stroke, then performs the main traction stroke, and wherein during the buffer stroke, the first locking member is pivoted relative to the buffer linkage, and the pin set is located at the second outermost position, and during the main traction stroke, the buffer linkage drives the pin set to be changed from the second outermost position to the second innermost position;

wherein the buffer linkage has a first link and a second link pivotally connected to each other, the first link is pivotally connected to the first locking member, the second link is pivotally connected to the pin set, the first link and the second link form an internal angle, and the internal angle is less than 180 degrees, when the first locking member is changed from the first outermost position toward the first innermost position, during the buffer stroke, the first locking member drives the first link to pivot relative to the second link, and the second link does not substantially drive the pin set, the pin set remains at the second outermost position, while during the main traction stroke, the first locking member drives the first link and the second link, and the second link drives the pin set to move to the second innermost position.

16. The supporting structure of claim 15, wherein the first link has a first head end and a first tail end, the second link has a second head end and a second tail end, the first head end is pivotally connected to the first locking member, the first tail end is pivotally connected to the second head end, the second tail end is pivotally connected to the pin set, and wherein during the buffer stroke, the first link and the second link are pivoted and the internal angle gradually becomes greater, the second tail end actually does not move, the pin set remains at the second outermost position, and during the main traction stroke, the first link is pivoted relative to the second link and the internal angle gradually becomes less, and the second tail end moves and drives the pin set to move to the second innermost position.

17. The supporting structure of claim 16, wherein the first arm includes a housing, the operating member has a knob and a rotating shaft connected to each other, the first locking member includes a hollow body and a hook connected to each other, the knob is protruded beyond the housing, the rotating shaft is rotatably inserted into the housing, and the hollow body is sleeved at the rotating shaft.

18. The supporting structure of claim 17, wherein the base includes a sleeve and a stopper, the stopper surrounds the sleeve, the pin set has a positioning tube, a pin, and a reset elastic member, the positioning tube is disposed at the first arm and communicates with the stopper, the pin is movably inserted into the positioning tube, and the reset elastic member is sleeved at the pin and respectively abutted against the positioning tube and the pin, so as to tend to make the pin partially protrude out of the positioning tube, when the first locking member is located at the first outermost position and engaged with the fixed frame, and when the pin set is located at the second outermost position and engaged with a lock hole of the stopper, the first arm is not able to swivel relative to the base, and the second arm is not able to tilt relative to the rotating base, and wherein when the first locking member is located at the first innermost position and the pin set is located at the second innermost position, the first arm is able to swivel relative to the base, and the second arm is able to tilt relative to the rotating base.

19. The supporting structure of claim 18, wherein when the positioning tube is misaligned with the lock hole of the stopper, the pin is blocked by the stopper, so that the pin is received in the positioning tube to compress the reset elastic member, and the pin pushes the first link and the second link to reduce the internal angle, the hollow body and the hook are integrally formed and are rotatable synchronously, the first locking member further includes a torsion spring, the hook is pivoted at the hollow body, and two ends of the torsion spring are respectively abutted against the hollow body and the hook.

* * * * *